UNITED STATES PATENT OFFICE.

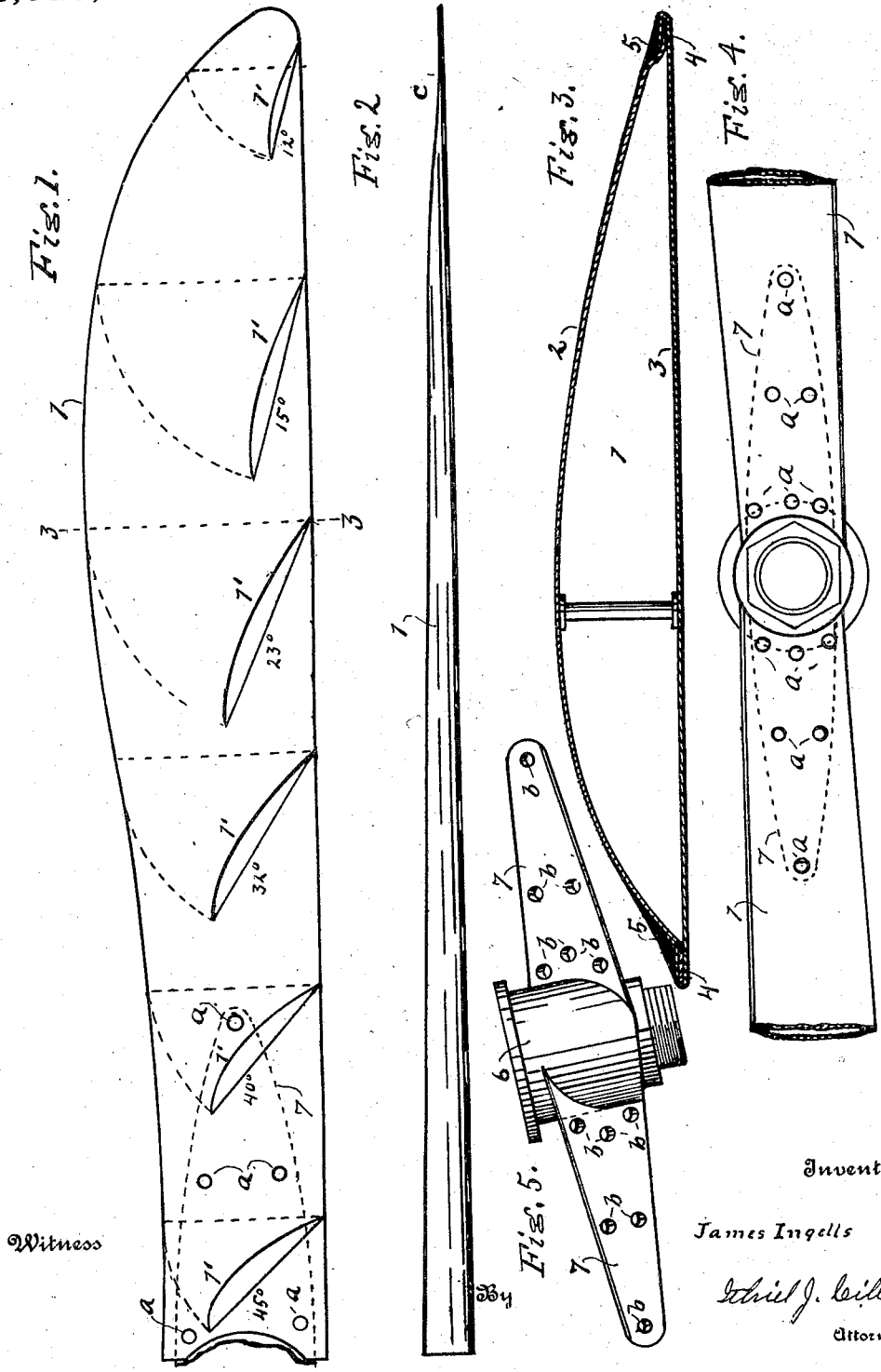

JAMES INGELLS, OF MUSKEGON, MICHIGAN.

AEROPLANE PROPELLER AND TRACTOR.

1,313,599.  Specification of Letters Patent.  Patented Aug. 19, 1919.

Application filed May 3, 1918. Serial No. 232,406.

*To all whom it may concern:*

Be it known that I, JAMES INGELLS, a citizen of the United States, residing at Muskegon, in the county of Muskegon and State of Michigan, have invented certain new and useful Improvements in Aeroplane Propellers and Tractors, of which the following is a specification.

My invention relates to improvements in metal wheels for aeroplanes, and its objects are: first, to provide a metal wheel, or propeller for aeroplanes that will be very strong and rigid, and at the same time will be as light as it is possible to have a propeller and give it the desired rigidity and resistance; second, to provide a means whereby the wings of the propeller may be rigidly and permanently secured to the hub; third, to provide a strong, light, hollow wing for aeroplanes with the edges so firmly formed as to wholly avert the possibility of the parts becoming separated no matter what velocity is given the propeller.

I attain these objects by the construction and arrangement of parts shown in the accompanying drawing in which Figure 1 is a plan of one of the wings of the propeller. Fig. 2 is an edge view of the same. Fig. 3 is a transverse section of the wing on the line 3—3 of Fig. 1, giving the normal dimensions of the propeller on this line. Fig. 4 shows short sections of the wings as they are connected with the hub, and, Fig. 5 is a side view of the hub showing the relative positions of its wing supports.

Similar reference characters indicate similar parts throughout the several views.

In the construction of this propeller, I use very thin sheet steel, preferably about sixteen gage. One side of each wing of the propeller should be flat, or practically flat or plane, as indicated at 3, and the other side, 2, should be made of such form that when assembled one side of the wing will show plane, and the other side will be of an irregular convex form. That is, the convexity should be gradual from one edge to a point considerably beyond its lateral center, and the curve should be much more abrupt from this point to the other edge of the wing, practically as shown in Fig. 3.

For the purpose of firmly and securely connecting the two plates, I turn the edges of the flat plate 3, over the edges of the convex plate, as at 4, to form a very close, firm and unyielding connection along the entire edges of the wings, and then spot weld, or acetylene weld the three layers of steel together, and fill the uneven, or offset parts with some very hard, lasting cement, as indicated at 5, so as to make the contour of this side of the wing as nearly uniform as possible, for the purpose, first, of insuring a smooth, unobstructed passage of the wings through the air when in operation, and, second, of giving the wings a uniform, sightly appearance. The extreme outer ends of the wings should be made very thin for some distance back, as indicated at *c*.

The hub for this wheel is made of the best cast steel, and has an arm, 7, extending directly outward from opposite sides of the hub 6, as shown in Fig. 5. These arms are punctured with several holes, *b*, and are designed to pass between the plates 2 and 3 at the butt or inner end of the wings, where they are securely connected with the wings by means of the several rivets *a*, and, to make assurance doubly sure, I prefer that they be spot welded, also.

The arms 7 are made integral with the hub 6 and of a form, shown in cross section, to exactly fit into the opening between the sides of the wings at the hub ends, and should each stand at an angle, transversely, of approximately forty-five degrees from the horizontal, or, more definitely, of the longitudinal center of the hub and the shaft that carry the wheel.

In Fig. 1 I have shown, diagrammatically, at the positions marked 1', the various angles at different points in the wings to illustrate, approximately, the spirality of the wings as they recede from the hub, showing approximately a 12 degree angle from the horizontal, at the extreme end of the blade, or wing.

What I claim as new in the art, is:

1. In an aeroplane tractor, wings made with thin concavo-convex sheet metal backs and thin plane sheet metal fronts forming slightly spiral hollow wings that are thick and open at one end and are lenticular in cross section, the spirality and thickness of the wings diminishing until the outer ends are flat and closed, the edges of the front metal plates folded over the edges of the back metal plates and integrally connected therewith, a hub having arms made integral therewith and positioned at sharp angles with the longitudinal center thereof, said arms made of size and form to extend well into, and to closely fit the openings in the ends of the wings, and means for firmly securing the wings upon said arms.

2. In an aeroplane tractor, wings made with concavo-convex sheet metal backs each prominently curved at one end and gradually decreased to a flat plate at the other end, a plane sheet metal front having its edges folded over the edges of the back plate and securely connected therewith forming slightly spiral, hollow wings with the back edges straight and the front edges gradually curved to gradually broaden the wings approximately two thirds of their length, thence gradually narrowing to, and rounding the outer ends of the wings, and a hub having long integral arms fitted closely into the hollow of the wings at one end, and means for securely connecting the wings and the arms together.

3. In an aeroplane tractor, wings each made with a thin concavo-convex back with one end prominent and gradually decreasing to a flat plane sheet at the other end, a plane thin sheet metal front plate, the edges of the front plate folded over the contacting edges of the back plate and securely connected therewith, the back edges made straight and thin, the front edges made thicker and curved to gradually increase the width to a given point, thence gradually narrowing the wings to, and rounding the outer ends, the wings slightly spiraled and the spirality decreasing as it approaches the outer ends, means for eliminating the projecting edge folds of the plate and rendering the surfaces of the wings absolutely smooth, a hub having integral arms properly positioned to extend into, and closely fill the hollows at the ends of the wings, and means for securely connecting the wings upon the arms.

Signed at Grand Rapids, Michigan, May 1, 1918.

JAMES INGELLS.